(12) United States Patent
Lee et al.

(10) Patent No.: US 6,569,949 B1
(45) Date of Patent: May 27, 2003

(54) PRESSURE-SENSITIVE ADHESIVES FOR MARKING FILMS

(75) Inventors: Ivan S. P Lee, Arcadia, CA (US); Graham Yeadon, Marbach (CH); Paul Keller, Gottileben (CH)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/586,122

(22) Filed: Jun. 2, 2000

Related U.S. Application Data

(60) Division of application No. 09/037,589, filed on Mar. 9, 1998, now Pat. No. 6,147,165, which is a continuation-in-part of application No. 08/829,002, filed on Mar. 31, 1997, now Pat. No. 5,895,801.

(51) Int. Cl.[7] ............... C09J 151/04; C09J 151/06; C09J 133/00
(52) U.S. Cl. ............... 525/255; 525/258; 525/261; 525/301; 524/460
(58) Field of Search ............... 525/301, 255, 525/258, 261; 524/460

(56) References Cited

U.S. PATENT DOCUMENTS

| | | | |
|---|---|---|---|
| 3,248,356 A | | 4/1966 | Snyder ............... 260/29.6 |
| 4,371,659 A | * | 2/1983 | Druschke |
| 4,564,664 A | * | 1/1986 | Chang |
| 4,948,822 A | | 8/1990 | Iovine et al. ............... 523/201 |
| 4,983,656 A | * | 1/1991 | Ito |
| 5,129,126 A | | 7/1992 | Huang ............... 24/3 |
| 5,164,444 A | | 11/1992 | Bernard ............... 524/833 |
| 5,264,532 A | | 11/1993 | Bernard ............... 526/261 |
| 5,278,227 A | | 1/1994 | Bernard ............... 524/817 |
| 5,405,879 A | | 4/1995 | Uemae et al. ............... 523/201 |
| 5,416,134 A | * | 5/1995 | Skoglund |
| 5,461,103 A | * | 10/1995 | Bafford |
| 5,550,181 A | | 8/1996 | Scholz ............... 524/460 |
| 5,895,801 A | * | 4/1999 | Lee |

FOREIGN PATENT DOCUMENTS

| | | | |
|---|---|---|---|
| DE | 0037923 B2 | 10/1981 | |
| DE | 3544882 | 11/1986 | |
| EP | 0144723 | 6/1985 | |
| EP | 0522791 | 1/1993 | |
| JP | 264077 | 11/1986 | ............... 524/460 |
| JP | 07-278517 | * 10/1995 | |
| JP | 07-329007 | * 12/1995 | |
| WO | WO9220722 | 11/1992 | |
| WO | WO9314161 | 7/1993 | |
| WO | WO9608320 | 3/1996 | |

OTHER PUBLICATIONS

English–language translation of Japanese Patent No. 264,077 (Nov. 1986).

* cited by examiner

*Primary Examiner*—David J. Buttner
(74) *Attorney, Agent, or Firm*—Christie, Parker & Hale, LLP

(57) ABSTRACT

Inherently tacky, pressure-sensitive adhesive compositions useful in marking film applications are provided. The compositions comprise polymer particles prepared by emulsion polymerization of at least one monomer mixture. The monomer mixture comprises at least one alkyl acrylate, the alkyl group of which has from about 4 to 12 carbon atoms, preferably in an amount of from about 73% to 90% by weight, at least one unsaturated carboxylic acid containing from about 3 to 5 carbon atoms, preferably in an amount of from about 2% to 12% by weight, and at least one hard monomer, preferably present in an amount of from about 5% to 15% by weight. The particles have a mean diameter of about 300 nm or less, as determined by laser light scattering. Preferably the hard monomer comprises a styrenic monomer, more preferably both a styrenic monomer and an alkyl methacrylate. In some embodiments, the compositions are prepared by sequential polymerization of the first and second monomer charges. The compositions may also contain one or more internal or external crosslinkers.

22 Claims, 2 Drawing Sheets

PRESSURE-SENSITIVE ADHESIVES FOR MARKING FILMS

CROSS REFERENCE TO RELATED APPLICATION

This application is a divisional of U.S. patent application Ser. No. 09/037,589 filed Mar. 9, 1998 which is now U.S. Pat. No. 6,147,165 which is a continuation-in-part of U.S. patent application Ser. No. 08/829,002, filed Mar. 31, 1997 now U.S. Pat. No. 5,895,801, the contents of which are incorporated by reference herein.

FIELD OF THE INVENTION

The present invention pertains to emulsion acrylic adhesives for use in marking films.

BACKGROUND OF THE INVENTION

Marking films are recognized in the art as laminates of a self-supporting polymeric film facestock or backing, such as polyvinyl chloride (PVC), and a layer of a pressure-sensitive adhesive (PSA). Prior to application to a substrate, the exposed surface of the PSA of the laminate is in contact with and protected by either a release liner or the outer surface of the facestock, which is provided with a release coating. Marking films are manufactured in the form of large rolls of the laminate, then cut to size depending on the application. Applications range from small advertising decals to automotive pinstriping to large printed signs, truck panels, and the like. The films may include or take the form of letters, numbers, logos and other indicia.

There are many requirements for a laminate to be used as a marking film. A very important requirement is durability of the laminate of the polymeric film facestock and adhesive for a period of months or years. The laminate of the polymeric film facestock and adhesive must remain functional for an expected period of time, after which the laminate must have retained the ability to be cleanly removed from the substrate without leaving an adhesive residue. Removal typically occurs with destruction of the facestock, with the facestock no longer being reusable. Accordingly, the adhesives are typically regarded more as "permanent" than as "removable". Clean removability refers to removal without leaving an adhesive residue on the substrate after a period of time. For a midlife marking film, this period is over one year, and typically five or more years, exposure to the elements, which can be predicted by weatherometer tests such as evaluation using Xenon arc aging in an Atlas Weather-o-meter, where 2000 hours exposure is the equivalent of five years.

Polyvinyl chloride films that have been used for marking film applications have a varied durability that depends on service life. Short life vinyl films are used for promotional sign applications where an expected service life is six months to one year. If plasticized, the vinyl is typically film-plasticized with a monomeric plasticizer. Cost is kept low by elimination of any primer or anchor and barrier layers. Medium and long life films are typically expected to have a useful life of up to about ten years, and normally contain UV and heat stabilizing components and polymeric plasticizers. A primer may be employed to enhance anchorage of the pressure-sensitive adhesive to the film, and a barrier layer may be employed to inhibit migration of plasticizer from the body of the film into the adhesive. Medium life films are generally calendered and have an expected service life of about one to ten years. Long life films are typically cast from solvent and have an expected service life of ten or more years. Vinyl films typically have a thickness of from about 1 to 5 mils, more typically about 2 to 3 mils.

Historically, the PSAs used for marking films typically have been solvent-based adhesives. PSAs are typically regarded as "permanent" if, when an attempt is made to remove a laminate of the PSA and a paper facestock from a substrate, the facestock tears. With vinyl or other polymeric facestocks, attempts at removal result in deformation of the facestock to the extent that it cannot be reused. The preferred adhesives desirably have some degree of initial repositionability, when the laminate is first applied to the substrate. Repositionability of the laminate without deformation of the facestock ends as adhesion grows with time due to molecular flow of the adhesive, which conforms to the substrate. Typically, the bond to a substrate will increase as much as 100% from an initial peel strength of about 12.5 N/25 mm after 10 to 15 minutes dwell on the substrate to about 15 N/25 mm to 17.5 N/25 mm within 24 hours. The requirement that the adhesive provide a sufficient bond strength such that the facestock is not reusable is an important characteristic for inhibiting vandalism of applied signs and other indicia in the form of advertisements, labels, and the like.

Other properties must also be present. The PSA must have sufficient shear strength to resist flow under the load of a thick polymeric facestock, it must yield to shrinkage of the facestock without exposing the adhesive, and it must be resistant to adhesive shrinkage so as to avoid wrinkling of the facestock. For outdoor applications, the PSA must be water-resistant with minimal to no significant loss of adhesion. Examples of typical outdoor applications include uses where the PSA is provided as a marking film label on a container exposed to sea water under transoceanic shipping conditions, and as a sign on public or private transportation throughfares in climates of high humidity or rainfall. Where the PSA is bonded to a transparent substrate such as glass, it is desirable that the PSA be clear or transparent and resist water whitening.

Another important property of PSA's used in marking films used as signs and labels on truck sidings and the like is an ability to survive a squeegeeing application process, where a substrate to be labeled is spray-washed with a surfactant solution, the marking film laminate is laid out on the clean, wet substrate, and after positioning the marking film the excess water is squeegeed away. This presents the problem of water whitening, the resistance to which is important, especially where the substrate is transparent. If water whitening occurs it must dissipate in a matter of a few hours.

Because of the high performance demands and requirements placed on these adhesives, particularly of water resistance, the adhesives currently used for marking film applications have been organic solvent -based. Organic solvents are known to be noxious to the senses and may be hazardous. In addition, they present environmental problems, all of which are avoided if the PSA is water-based, such as emulsion PSAs. Additionally, solvent-based PSAs tend to be more expensive than emulsion PSAs. Emulsion PSAs, however, are notoriously water-sensitive and whiten in some instances by mere application of a drop of water. While some emulsion copolymers, such as a 2-ethylhexyl acrylate-butyl acrylate-vinyl acetate emulsion copolymer, have been employed for general purpose, short life, marking film applications, there have not yet been proposed functional adhesives for medium and longer term marking film service applications.

The present invention is, therefore, directed to water-resistant, i.e., resistant to water-whitening and water deterioration, PSAs where the carrier is water, and which, when employed in marking film label applications, will cleanly remove from the substrate even after many years of exposure to the elements.

SUMMARY OF THE INVENTION

According to the present invention, emulsion acrylic copolymers useful as PSAs for marking films applications are provided. The copolymers are inherently tacky and are useful as pressure-sensitive adhesives that form a permanent bond to a substrate, but are removable from the substrate without leaving an adhesive residue—even after years of exposure to the elements. Nonlimiting examples of such substrates include metal, glass, and painted surfaces. The copolymers are advantageously prepared as high solids content emulsions.

In one embodiment, the invention is directed to an inherently tacky, pressure-sensitive adhesive composition useful for marking films, comprising polymer particles prepared by emulsion polymerization of at least one monomer mixture comprising:

1) at least one alkyl acrylate, the alkyl group of which has from about 4 to 12 carbon atoms, 2) at least one unsaturated carboxylic acid containing from about 3 to 5 carbon atoms, and 3) at least one hard monomer, in addition to the at least one unsaturated carboxylic acid, preferably at least one styrenic monomer;

wherein the particles have a mean diameter of about 300 nm or less, as determined by laser light scattering. Particularly preferred are emulsion copolymer particles having a mean diameter of from about 100 to 250 nm, more preferably from about 135 to 190 nm. It has been discovered that adhesive compositions comprising particles having a diameter in this range are especially resistant to water and solvents.

In another embodiment, the invention is directed to an inherently tacky, pressure-sensitive adhesive composition useful for marking films, comprising polymer particles prepared by emulsion polymerization of at least one monomer mixture comprising:

1) at least one alkyl acrylate, the alkyl group of which has from about 4 to 12 carbon atoms, present in a total amount of from about 73% to 90% by weight, based on the total weight of the monomers;

2) at least one unsaturated carboxylic acid containing from about 3 to 5 carbon atoms, present in a total amount of from about 2% to 12% by weight, based on the total weight of the monomers, and 3) at least one hard monomer, other than the at least one unsaturated carboxylic acid, present in a total amount of from about 5% to 15% by weight, based on the total weight of the monomers.

In yet another embodiment, the invention is directed to an inherently tacky, pressure-sensitive adhesive composition useful for marking films, comprising:

a) a first copolymer formed by emulsion polymerization of a first monomer charge comprising:
1) at least one alkyl acrylate, the alkyl group of which has from about 4 to 12 carbon atoms, present in an amount of from about 73% to 90% by weight, based on the total weight of the first monomer charge;
2) at least one unsaturated carboxylic acid containing from about 3 to 5 carbon atoms and present in a total amount of from about 2 to about 12% by weight, based on the total weight of the first monomer charge, and
3) at least one hard monomer, other than the at least one unsaturated carboxylic acid, present in an amount of from about 5% to 15% based on the total weight of the first monomer charge; and b) a second copolymer formed by emulsion polymerization of a second monomer charge comprising:
1) at least one alkyl acrylate, the alkyl group of which has from about 4 to 12 carbon atoms, and
2) at least one unsaturated carboxylic acid containing from about 3 to 5 carbon atoms and present in a total amount from about 7 to about 10% by weight, based on the total weight of the second monomer charge.

In the above embodiments, preferably one or more of the monomer mixtures further comprises at least one chain transfer agent.

Additionally, the above compositions preferably further comprise a surfactant system comprising at least one, and more preferably at least two, surfactants. Preferably, the surfactant system is present in the compositions in an amount of from about 0.5 to 5 parts by weight per 100 parts per weight of the monomers.

The compositions also can be crosslinked with at least one crosslinking agent. The crosslinking agent can be copolymerized with one or more of the monomer mixtures or added after polymerization of the monomer mixture(s).

Although not required, the compositions can be prepared by sequential polymerization of two or more monomer mixtures, as described above, whereby a first monomer mixture (or monomer charge) is allowed to react and then a second monomer mixture (or monomer charge) is allowed to react. The compositions of the two monomer charges may be the same or different. The first monomer charge is emulsion polymerized to form a first copolymer, and the second monomer charge is emulsion polymerized to form a second copolymer. In a preferred embodiment, the compositions of the monomer charges are the same, except that a chain transfer agent is added to the second monomer charge, resulting in the second copolymer having a lower molecular weight than the first copolymer.

Although not bound by theory, emulsion polymers formed by sequential polymerization are believed to have a core/shell structure, with copolymers formed from the first monomer charge making up the core of each emulsified particle, and copolymers formed from the second monomer charge making up the shell of each particle.

BRIEF DESCRIPTION OF THE DRAWINGS

The attached drawings schematically illustrate the sequentially polymerized copolymers of this invention in comparison to a blend of copolymers particles wherein.

DETAILED DESCRIPTION

Figure 1:
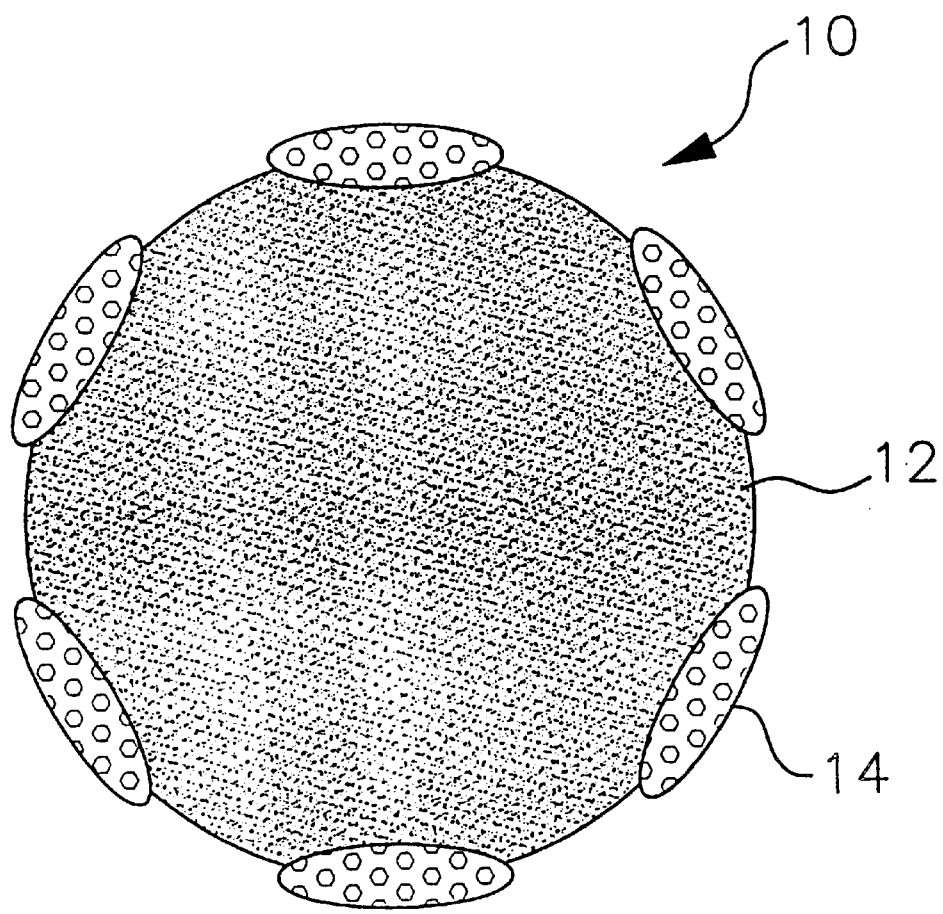
FIG. 1 depicts a sequentially polymerized copolymer particle.

According to the present invention, an acrylic composition that is useful as a PSA for marking films applications is provided.

In one embodiment, the invention is directed to an inherently tacky, pressure-sensitive adhesive composition useful for marking films, comprising polymer particles prepared by emulsion polymerization of at least one monomer mixture comprising:

1) at least one alkyl acrylate, the alkyl group of which has from about 4 to 12 carbon atoms,
2) at least one unsaturated carboxylic acid containing from about 3 to 5 carbon atoms, and
3) at least one hard monomer other than the at least one unsaturated carboxylic acid, preferably at least one styrenic monomer;

wherein the particles have a mean diameter of about 300 nm or less, as determined by laser light scattering. The relatively small particle size enhances the water and solvent resistance of the adhesive composition. Preferably, the particles have a mean diameter of from about 30 nm to 300 nm, more preferably from about 100 nm to 250 nm, still more preferably from about 135 nm to 190 nm. Particle size determinations are conveniently made using, for example, a Zetamaster S particle sizer (available from Malvern Instruments Ltd., Worcestershire, England) and using intensity-weighted averaging. Particle size determinations can also be made using other particle size analyzers, such as the Nicomp spectrometer, Model HN 5-90 equipped with an autocorrelator Model TC-100.

As is known to those skilled in the art, emulsion polymer particle size is dependent on a number of variables. For example, increasing the agitation speed of the polymerization reactor decreases the particle size. Similarly, increasing the temperature of the reaction decreases particle size. Additionally, reducing the surfactant concentration in the initial reactor charge increases particle size. The size of any initial monomer charge and the feed rate of the monomer charge also can affect the particle size.

In another embodiment, the invention is directed to an inherently tacky, pressure-sensitive adhesive composition useful for marking films, comprising polymer particles prepared by emulsion polymerization of at least one monomer mixture comprising:

1) at least one alkyl acrylate, the alkyl group of which has from about 4 to 12 carbon atoms, present in a total amount of from about 73% to 90% by weight, based on the total weight of the monomers;
2) at least one unsaturated carboxylic acid containing from about 3 to 5 carbon atoms, present in a total amount of from about 2% to 12% by weight, based on the total weight of the monomers, and
3) at least one hard monomer, present in a total amount of from about 5% to 15% by weight, based on the total weight of the monomers.

In yet another embodiment, the invention is directed to an inherently tacky, pressure-sensitive adhesive composition useful for marking films, comprising:

a) a first copolymer formed by emulsion polymerization of a first monomer charge comprising:
1) at least one alkyl acrylate, the alkyl group of which has from about 4 to 12 carbon atoms, present in an amount of from about 73% to 90% by weight, based on the total weight of the first monomer charge;
2) at least one unsaturated carboxylic acid containing from about 3 to 5 carbon atoms and present in a total amount of from about 2 to about 12% by weight, based on the total weight of the first monomer charge, and
3) at least one hard monomer other than said at least one unsaturated carboxylic acid, present in an amount of from about 5% to 15% based on the total weight of the first monomer charge; and b) a second copolymer formed by emulsion polymerization of a second monomer charge comprising:
1) at least one alkyl acrylate, the alkyl group of which has from about 4 to 12 carbon atoms, and
2) at least one unsaturated carboxylic acid containing from about 3 to 5 carbon atoms and present in a total amount from about 7 to about 10% by weight, based on the total weight of the second monomer charge.

The first copolymer is present in the copolymer particles in an amount of at least 50%, preferably at least 60%, and more preferably about 90% by weight, based on the total weight of the first and second copolymers.

The above compositions are formed by copolymerizing a plurality of monomers. In one embodiment, a single monomer charge, containing all of the monomers to be polymerized, is fed into a reactor over time and allowed to react. In another embodiment, emulsion copolymer particles are prepared by sequential polymerization of two or more separate monomer charges. Alternative, the compositions can be formed by separately copolymerizing two or more monomer mixtures, and the resulting emulsion copolymers are blended together to form an acrylic composition. In each case, the monomer charges may have the same composition or different compositions. In a preferred embodiment, an adhesive composition is prepared by sequential polymerization of two monomer charges that are compositionally identical except for the presence of a chain transfer agent in the second monomer charge. This results in the second copolymer having a lower molecular weight than the first copolymer.

Whether the copolymers are formed by sequential polymerization or are separately polymerized and then blended, the resulting composition will aggressively bond a polymeric backing or facestock to a substrate for a period of years and yet remain removable from the substrate with attendant destruction or deformation of the facestock. Removal is clean, i.e., without leaving a perceptible adhesive residue on the substrate.

Polymerization is carried out by, e.g., preparing a pre-emulsion of monomers and commencing polymerization using free-radical initiators. The pre-emulsion can be introduced into the reactor as a single charge, or fed in incrementally to control the rate of reaction. In some embodiments, sequential polymerization is used, and two or more monomer charges are separately emulsified and allowed to react in distinct stages. To that end, separate pre-emulsions of monomers are prepared, a reactor is charged with an initial soap (surfactant) solution and a catalyst (initiator) solution, a first pre-emulsion from the first monomer charge is gradually fed into the reactor, and polymerization is initiated and allowed to propagate. The catalyst (initiator) solution can also be introduced after the first pre-emulsion is initially introduced into the reactor. After polymerization of the first pre-emulsion, a second pre-emulsion from the second monomer charge is gradually fed into the reactor and polymerization continues. The result is a copolymer system of emulsified copolymer particles quite distinct from emulsion copolymers prepared by batch polymerization.

Figure 2:
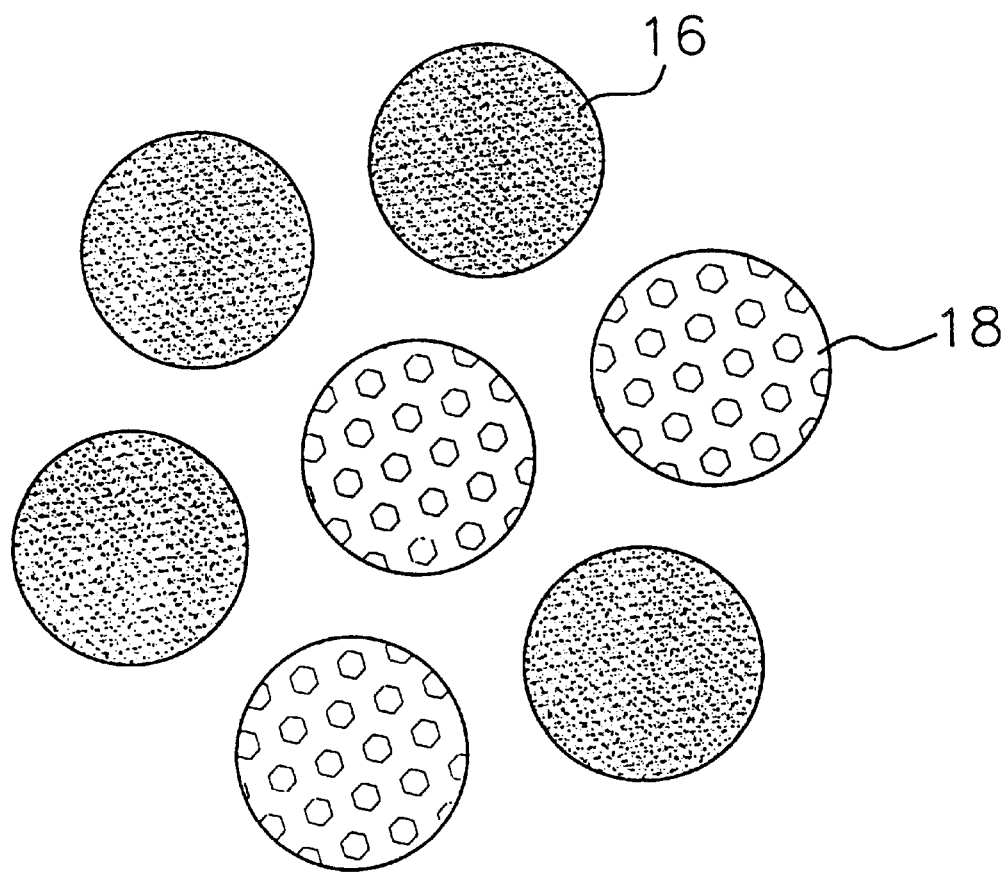
FIG. 2 depicts a mixture of polymer particles formed by separate polymerization followed by blending.

Although not bound by theory, it is believed that sequential polymerization of the two monomeric pre-emulsions results in an emulsion of domain-type copolymeric particles, each having an inner core of first copolymeric composition and an outer shell or region of second copolymeric composition, partially or totally encapsulating the core. FIG. 1 provides a schematic illustration of one hypothesis of the appearance of such a particle 10 formed by sequential polymerization, having an inner core region 12 and an outer shell or series of outer regions 14 partially surrounding the core. As depicted in FIG. 2, if the individual copolymers are prepared by separate polymerization copolymerized and then mixed, they form a random blend of first 16 and second 18 copolymer particles having little or no attachment or association with each other.

It has been found that the products of sequential polymerization generally provide demonstrably different PSA properties compared to a blend of individually polymerized copolymers. There may, of course, also be provided a mixture of sequentially polymerized copolymers and individual first and second copolymers.

The monomers used to prepare the emulsion copolymers include alkyl acrylates, methacrylates, unsaturated carboxylic acids, "hard" monomers, such as styrene, and other monomers that will now be described. Alkyl acrylate monomers that may be used in connection with the present invention preferably have about 4 to 12 carbon atoms in the alkyl group. Nonlimiting examples include butyl acrylate, 2-ethylhexyl acrylate, isooctyl acrylate, and isodecyl acrylate. The presently preferred alkyl acrylate monomers are butyl acrylate and 2-ethylhexyl acrylate. The alkyl acrylate monomers are preferably present in the monomer mixtures in a total amount ranging from about 73% to 90% by weight, more preferably from about 80% to 85% by weight, based on the total weight of the monomer mixture.

Unsaturated carboxylic acids used in the present compositions serve to impart cohesive strength and promote adhesion to the polar surfaces. Nonlimiting examples of unsaturated carboxylic acids useful in the present invention include acrylic acid, methacrylic acid, itaconic acid and beta-carboxyethyl acrylate. Preferably, the carboxylic acids employed comprises a mixture of methacrylic acid and acrylic acid. More preferably, the methacrylic acid is present in an amount of from about 30 to 50 percent by weight based on the total weight of the carboxylic acids, with the balance being acrylic acid. The combination of carboxylic acids affects water resistance and can be used for clear and pigmented films. The unsaturated carboxylic acids are preferably present in the monomer mixtures in a total amount of from about 2% to 12% by weight, more preferably from about 4% to 7% by weight, based on the total weight of the monomer mixture.

As used herein, the term "hard monomers" refers to monomers that, when homopolymerized, form a polymer having a glass transition temperature ($T_g$) greater than about 0° C. Preferred hard monomers include those having one or more vinyl esters containing from about 2 to 16 carbon atoms in the alkyl group. Representative vinyl esters include vinyl acetate, vinyl butyrate, vinyl propionate, vinyl isobutyrate, vinyl valerate, vinyl versitate, and the like. Other useful hard monomers include styrenic monomers such as styrene, alpha methyl styrene and the like; alkyl methacrylates, such as methyl methacrylate, ethyl methacrylate, butyl methacrylate and the like; and amides, such as an n-isobutoxymethyl acrylamide and the like. The hard monomers are preferably present in a total amount of from about 5% to about 15% by weight, more preferably from about 8% to 12% by weight, based on the total weight of the monomers.

In a preferred embodiment, the hard monomers comprise at least one styrenic monomer and at least one alkyl methacrylate, the alkyl group of which has from 1 to about 4 carbon atoms. More preferably, the styrenic monomer is styrene and the alkyl methacrylate is methyl methacrylate. It is preferred that the styrenic monomer is present in a total amount of from about 3% to 8% by weight, based on the total weight of the monomers, and the alkyl methacrylate is present in a total amount of from about 3% to 12% by weight, based on the total weight of the monomers.

Other vinyl unsaturated monomers that aggressively copolymerize with the principal monomers may also be used to modify copolymer properties in the present compositions. Other useful monomers that may be mentioned include diesters of dicarboxylic acids and mixtures thereof, in which each ester group of the diester independently contains from about 8 to 16, preferably from about 8 to 12, carbon atoms. The preferred diesters are di-2-ethylhexyl maleate (dioctyl maleate), di-2-ethylhexyl fumarate and mixtures thereof. It is believed that when such diester-type monomers are included, the resulting polymer particles have more of a locked, fixed configuration, and less tendency to ooze from a construction (laminate) made with the polymers. Another monomer useful in the present compositions is a silicone acrylate monomer. As used herein, the term silicone acrylate monomer refers to silicone oligomers having at least one acrylate or methacrylate functionality. An example is the silicone acrylate sold by Goldschmidt (Esson, Germany) under the trade name RC-705; it is believed to be a PDMS-type silicone with an acrylate functionality greater than 2.

In the present adhesive compositions, it is preferred to adjust the amounts and identities of the monomers in a manner that yields an acrylic emulsion copolymer system having an overall $T_g$ sufficiently low as to impart good shear strength and low edge ooze to the resulting laminate construction, e.g., about −30° C. To that end, in one embodiment of the invention, a first monomer charge is selected to yield a relatively hard first (core) copolymer having a $T_g$ of from about 0° C. to about −25° C., preferably from about −5° C. to about −25° C. At the same time, a second monomer charge can be adjusted to yield a relatively soft copolymer having a $T_g$ below about −25° C., preferably of from about −25° C. to about 45° C., thereby providing molecular flow for "wet out" of target substrates.

The formed copolymers are generally free of hazing and whitening characteristics, and, while they may initially whiten on application to the substrate, they clear with time as water diffuses through the adhesive film, and are cleanly removable from a substrate after a useful life of about one or even ten years or more.

Polymerization is carried out in the presence of one or more free radical initiators. Nonlimiting examples of useful polymerization initiators include water-soluble initiators, for example, persulfates, such as sodium persulfate ($Na_2S_2O_8$) and potassium persulfate; peroxides, such as hydrogen peroxide and tert-butyl hydroperoxide (t-BHP); and azo compounds, such as VAZO™ initiators; used alone or in combination with one or more reducing agents or activators, for example, bisulfites, metabisulfites, ascorbic acid, erythorbic acid, sodium formaldehyde sulfoxylate (available from Henkel of America, Inc.), ferrous sulfate, ferrous ammonium sulfate, and ferric ethylenediaminetetraacetic acid. Enough initiator is used to promote free-radical polymerization of the monomers, for example, about 0.15 to 0.5 parts by weight per 100 parts by weight monomers.

It is also preferred, in some embodiments, to employ a small amount of a chain transfer agent or other molecular weight regulator to control average polymer chain length of the acrylic copolymers. Nonlimiting examples include n-dodecyl mercaptan (n-DDM), t-dodecyl mercaptan (t-DDM), monothioglycerol, mercapto acetates, and long chain alcohols. The chain transfer agent can be added to either or both monomer changes. If a chain transfer agent is included, it is present in an amount of, e.g., about 0.01 to 0.5% by weight of the monomers with which it is allowed to react.

The emulsion copolymers of the present invention are prepared with excellent conversions at a reaction temperature of from about 65° C. to 85° C. in the presence of one or more catalysts, with the monomer mixture(s) being fed in over a period of about 3 to 5 hours. Reaction pH can be adjusted to within a range of from about 4.0 to 7.0 by addition of ammonia, sodium bicarbonate or another base.

The copolymers may be crosslinked by use of an internal and/or an external crosslinking agent. As used herein, the term "internal crosslinking agent" refers to a crosslinking agent that is copolymerized with a mixture of monomers. In contrast, the term "external crosslinking agent" refers to a crosslinking agent added after polymerization of the monomer mixture(s). Internal crosslinking agents include polyfunctional compounds having at least two nonconjugated carbon-carbon double bonds per molecule, which then become part of the polymer during polymerization. Examples of suitable internal crosslinking agents include diallyl maleate, diallyl phthalate, and multifunctional acrylates and methacrylates including polyethylene glycol diacrylate, hexanediol diacrylate, ethoxylated trimethylolpropane triacrylate, pentaerythritol triacrylate, propylene glycol diacrylate, tripropylene glycol triacrylate, and trimethylolpropane trimethacrylate. Non-limiting examples of suitable external crosslinking agents include polyvalent metal salts or complexes, such as zirconium ammonium carbonate, zinc ammonium carbonate, aluminum acetate, zinc acetate and chromium acetate. The presently preferred external crosslinking agent is zirconium ammonium carbonate, such as that sold under the trade name Bacote 20 by Magnesium Elektron, Inc. (Flemington, N.J.). When two monomer charges are used, both can contain a crosslinking agent. However, it is preferable to limit internal crosslinking to the first copolymer.

As indicated above, emulsion polymerization is carried out in the presence of a surfactant system, i.e., a soap solution, which preferably contains at least one, more preferably at least two, surfactants. The surfactant system is preferably present in an amount of from about 0.5 to 5 parts by weight to 100 parts by weight monomers, more preferably from about 1 to 3 parts per 100 parts by weight of the monomers. Although a variety of nonionic, anionic, and/or cationic surfactants can be used to prepare the acrylic copolymers, it is preferred to employ a mixture of two or more surfactants, for example, Disponil FES77, a sodium lauryl ether surfactant, available from Henkel of America, Inc. (King of Prussia, Pa.); and Aerosol OT-75, a sodium dioctyl sulfusuccincate surfactant, available from American Cyanamid (Wayne, N.J.). A stabilizer, such as TSPP (sodium pyrophosphate), available from J. T. Baker (Mallinckrodt Baker, Inc., Phillipsburg, N.J.), is also preferably included. Other nonlimiting examples of useful surfactants include cetyl trimethyl ammonium bromide, available from Aldrich (Milwaukee, Wis.); AR-150, a nonionic, ethoxylated rosin acid emulsifier available from Hercules, Inc. (Wilmington, Del.); Alipal CO-436, a sulfated nonylphenol ethoxylate available from Rhone-Poulenc; Trem LF40, a sodium alkyl allyl sulfusuccinate surfactant, available from Henkel of America, Inc.; Polystep F-9, a nonylphenol ethoxylate, and Polystep B-27, a sodium nonylphenol ethoxylated sulfate, both available from Stepan Company, Inc. (Winnetka, Ill.); and disodium ethoxylated alkyl alcohol half esters of sulfosuccinic acid, described in U.S. Pat. No. 5,221,706 (incorporated by reference herein), and available from VWR Scientific Corp., Sargent-Welch Division (Westchester, Pa.). Other surfactants include the Triton X-series of surfactants made by Union Carbide (Danbury, Conn.).

Prior to coating on a substrate, the adhesive compositions are advantageiously modified by addition of one or more additional components, such as biocides and defoamers. Non-limiting examples of suitable biocides include Kathon LX, commercially available as a 1.5% solution from Rohn & Haas (Philadelphia, Pa.), and Metatin 910, commercially available from ACIMA (Buchs, Switzerland). Non-limiting examples of suitable defoamers include Drewplus T-1201 and Drewplus 1-191, commercially available from Ashland Chemical Company (Dublin, Ohio).

The adhesive compositions of the present invention provide both a high cohesive strength and holding power to substrates, and have the ability to be removed from such substrates without leaving an adhesive residue, even after a period of years. The adhesives are particularly useful in marking films applications. In a typical construction, the facestock is calendered or cast vinyl (PVC), and the PSA composition is either coated directly on the facestock or, more typically, coated on a release liner (such as a silicone-coated paper or pre-siliconized polypropylene film), dried, and then laminated to the vinyl facestock. Cast vinyl is more expensive, but provides better dimensional stability. Vinyl film is available from a wide variety of suppliers, well known to those skilled in the art. A partial listing can be found in *Modern Plastics*, Mid-November 1997, at p. G-17, incorporated by reference herein.

EXAMPLES

The following nonlimiting examples illustrate the preparation and properties of adhesive compositions according to the present invention. In the examples and tables, the following abbreviations have the meaning shown:

TSPP: sodium pyrophosphate, a stabilizer

Aerosol OT-75: sodium dioctyl sulphosuccinate surfactant

Trem LF-40: An anionic surfactant

Disponil FES 77: sodium lauryl ether sulfate surfactant

TPGTA: Tripropylene glycol triacrylate, an internal crosslinker n-DDM: n-dodecyl mercaptan Bacote 20: zirconium ammonium carbonate SS: Stainless Steel TNO: Standard European painted panel

Example 1

Inherently tacky, emulsion acrylic copolymers were prepared by sequential polymerization using the components present in Table 1, according to the following protocol.

Soap solutions A(1) and A(2), monomer charges B(1) and B(2), and catalyst charge C were prepared in separate vessels. Pre-emulsions I and II were separately formed by combining soap solution A(1) with monomer charge B(1), and combining soap solution A(2) with monomer charge B(2), respectively. A jacketed, multi-neck reactor equipped with nitrogen inlet valve stirrer and thermometer was charged with initial reactor charge D, and the contents of the reactor were heated to 76° C., with agitation. After purging the reactor atmosphere with nitrogen, pre-emulsion I was fed into the reactor over time, with agitation. Simultaneously, catalyst charge C was fed into the reactor. The reactor temperature was maintained at 78° C. to 80° C. After completion of the pre-emulsion I feed, pre-emulsion II was fed into the reactor, with agitation, while the catalyst feed was continued. The total elapsed time of the pre-emulsion and catalyst feeds was about 3 to 5 hours. After completion of the reaction, a post-polymerization charge E was introduced to eliminate any unreacted monomers. Thereafter, the pH of the reactor was raised by addition of a 14% ammonia solution. Defoamer and biocide were then added to the reactor. A small amount of deionized water was added as a diluent.

The resulting formulation was translucent with a grit of 50–100 ppm on a 50 micron filter. The total solids content was 54.0±1.0%. The adhesive had a pH of 7.0±0.5.

TABLE 1

Reaction Formulation for Example 1
Parts by Weight

|  |  | Charge 1 | Charge 2 | (1 + 2) | (1 + 2) Dry |
|---|---|---|---|---|---|
| A) | Soap Solution |  |  |  |  |
|  | Deionized water | 139.73 | 41.33 | 181.06 | — |
|  | T.S.P.P. (59.7%) | 1.87 | 0.55 | 2.42 | 1.45 |
|  | Aerosol TO-75 (75%) | 3.30 | 0.97 | 4.27 | 3.20 |
|  | Trem LF 40 (40%) | 11.00 | 3.25 | 14.25 | 5.70 |
|  | Disponil FES 77 (32.5%) | 15.40 | 4.60 | 20.00 | 6.60 |
| B) | Monomers |  |  |  |  |
|  | 2-Ethylhexyl Acrylate | 134.06 | — | 134.06 | 134.06 |
|  | Butyl Acrylate | 422.84 | 189.10 | 611.94 | 611.94 |
|  | Vinyl Acetate | 105.00 | — | 105.00 | 105.00 |
|  | Methacrylic Acid | 12.60 | 6.60 | 19.20 | 19.20 |
|  | Acrylic Acid | 24.60 | 12.00 | 36.60 | 36.60 |
|  | TPGTA | 10.50 | 2.20 | 12.70 | 12.70 |
|  | N-DDM | 0.40 | 0.10 | 0.50 | 0.50 |
| C) | Catalyst Solution for Incremental Addition |  |  |  |  |
|  | Deionized Water |  | 97.00 | 97.00 | — |
|  | Potassium Persulfate |  | 3.00 | 3.00 | 3.00 |
| D) | Initial Reactor Charge |  |  |  |  |
|  | Deionized Water |  | 414.30 | 414.30 | — |
|  | Disponil FES 77 (32.5%) |  | 3.40 | 3.40 | 1.11 |
|  | Potassium Persulfate |  | 2.30 | 2.30 | 2.30 |
| E) | Catalyst Solution for Post Addition |  |  |  |  |
|  | Deionized Water |  | 2.50 | 2.50 | — |
|  | Disponil FES 77 (32.5%) |  | 0.10 | 0.10 | 0.03 |
|  | t-Butylhydroperoxide (75%) |  | 0.80 | 0.80 | 0.60 |
| F) | 14% Ammonia Solution |  | 24.00 | 24.00 | — |
| G) | Defoamer: Drewplus L-191 |  | 1.00 | 1.00 | 1.00 |
| H) | Biocide: Kathon LX (1.5%) |  | 0.80 | 0.80 | 0.01 |
| I) | Deionized Water |  | 28.80 | 28.80 | — |

Example 2

Inherently tacky emulsion acrylic copolymers were prepared by sequential polymerization using the following polymerization protocol and the components presented in Table 2.

A jacketed, multi-neck reaction vessel equipped with nitrogen inlet valve, stirrer and thermometer was charged with an initial reactor charge comprising deionized water and surfactant, and the temperature was raised to 78° C. Potassium persulfate was added, the reactor contents were mixed for five minutes, and nitrogen was bubbled into the reactor.

In separate vessels, a soap solution and a monomer charge were prepared. A pre-emulsion was prepared by mixing the soap solution with the monomer charge. The pre-emulsion was then introduced to the reactor over 190 minutes, with agitation, and the temperature of the reactor was allowed to increase to approximately 80 to 82° C.

In a separate vessel, a catalyst charge was prepared. Approximately 20 minutes after the pre-emulsion was initially introduced into the reactor, the catalyst charge was fed into the reactor, with agitation, over a 250 minute period.

Approximately 190 minutes after commencement of the pre-emulsion feed, approximately 76% of the pre-emulsion had been introduced into the reactor. n-DDM was then added to the remaining pre-emulsion, with stirring, and the remainder of the pre-emulsion was then added to the reactor, with agitation, over a period of approximately 50 minutes.

After completion of the pre-emulsion and catalyst charge feeds, the contents of the reactor were held for approximately 60 minutes at 80 to 82° C., with stirring. Thereafter, any unreacted monomers were removed with a post-polymerization catalyst charge.

An ammonia/water mixture (24% ammonia) was then introduced to the reactor to raise the pH of the reaction mixture to about 7.0. The reactor contents were then cooled to 38° C. and a biocide was added.

The adhesive composition contained emulsion particles having a mean diameter of 165 nm, as measured by laser light scattering.

Modified formulations (2A, 2B, 2C) based on Example 2 were prepared by adding different levels of external crosslinker (2%, 4%, 6%) to the base copolymers.

TABLE 2

Reaction Formulation for Example 2

| REACTION COMPONENT | WEIGHT (grams) |
|---|---|
| A) Initial Reactor Charge |  |
| Deionized Water | 648.93 |
| Disponil FES-77 | 9.40 |
| Potassium Persulfate | 2.69 |
| B) Soap Solution |  |
| Deionized Water | 273.78 |
| Disponil FES-77 | 39.67 |
| Aerosol TO-75 | 8.57 |
| tetra-Sodium Pyrophosphate | 0.73 |
| C) Monomers & n-DDM |  |
| 2-Ethyl Hexyl Acrylate | 212.75 |
| Butyl Acrylate | 862.46 |
| Methyl Methacrylate | 88.40 |
| Styrene | 58.28 |
| Methacrylic Acid | 23.26 |
| Acrylic Acid | 47.75 |
| n-DDM | 0.15 |
| D) Catalyst Charge |  |
| Deionized Water | 134.44 |
| Potassium Persulfate | 2.69 |
| E) Post-Polymerization Catalyst Charge |  |
| Deionized Water | 2.50 |
| Potassium Persulfate | 0.12 |
| F) Biocide |  |
| Metatin 910 | 2.45 |

Example 3

Using the emulsion copolymers of Example 2, a preferred marking film formulation was prepared. Emulsion acrylic copolymers prepared as in Example 2 were diluted with water and further neutralized with base (ammonia, 24% soln.), and 0.656% by weight of a crosslinker (Bacote 20) was added. 0.2% by weight of a defoamer (Drewplus T-1201) was then added, and the formulation was ready for casting on a facestock. The formulation had a solids content of 48% and a pH of about 7.3. The viscosity of the formulation was 1430 mPAs.

As modified with the crosslinking agent, the formulation of Example 3 exhibits better solvent resistance than that of Example 2.

Example 4

Inherently tacky, emulsion acrylic copolymers containing a silicone acrylate were prepared by sequential polymerization, using the polymerization protocol described below.

A jacketed, multi-neck reaction vessel equipped with nitrogen inlet valve, stirrer and thermometer was charged with an initial reactor charge comprising deionized water and Disponil FES-77 (Polystep B-20 can be used in place of Disponil FES-77). The reactor was purged with nitrogen and heated to 80° C. Potassium persulfate was added, the reactor contents were mixed for five minutes, and the nitrogen purge was turned off.

In separate vessels, a soap solution and monomer charge were prepared. Two pre-emulsions were prepared by mixing the first and second soap solutions with the first and second monomer charges, respectively, under good agitation. The first pre-emulsion was fed to the reactor at 2.75 parts by weight per minute for 191 minutes.

In a separate vessel, a catalyst charge was prepared. Approximately 20 minutes after the first pre-emulsion was initially introduced into the reactor, the catalyst charge was fed into the reactor at 0.23 parts by weight per minute for 244 minutes. The reaction temperature was kept between 80° C. and 85° C., and agitation was increased when necessary.

Ten minutes after the completion of the first pre-emulsion addition, the second pre-emulsion was introduced to the reactor at 2.75 parts by weight per minute for 50 minutes. The reaction temperature was maintained between 80° C. and 85° C.

After all of the second pre-emulsion and catalyst charge were introduced into the reactor, the contents of the reactor were held for approximately 60 minutes at 80 to 83° C. The reactor was then cooled to 40° C.

An ammonia/water mixture (24% ammonia) was slowly introduced to the reactor, under good agitation, to adjust the reaction mixture to a pH of about 4 to 7. A defoamer (Drewplus L-191) was then added. The reactor contents were cooled to 35° C. and a biocide (Kathon LX) was added. The total solids and viscosity were adjusted using rinse water, and the reaction mixture was filtered through a 50 micron filter. The compositions had a pH of 7.0.

The composition contained emulsion copolymer particles having a mean diameter of 147 nm, as measured by laser light scattering.

Modified formulations (4A–4H) based on Example 4 were prepared generally as described above:

4A—Prepared like Example 4, but without RC-705;
4B—Prepared like Example 4;
4C—Prepared like Example 4, but the ammonia/water mixture was added while the reactor was still hot;
4D—Prepared like Example 4, but the monomers were introduced as a single charge;
4E—Prepared like 4D, but the initial reactor charge contained 30% less water and 30% less surfactant;
4F—Prepared like 4D, but the initial reactor charge contained 30% less surfactant;
4G—Prepared like 4F, but a post-polymerization catalyst (potassium persulfate) was used to remove any unreacted monomers;
4H—Prepared like 4G, but the reaction temperature was maintained at 85° C.

TABLE 3

Reaction Formulation for Example 4

| REACTION COMPONENT | PARTS BY WEIGHT | |
| --- | --- | --- |
|  | Charge 1 | Charge 2 |
| A) Initial Reactor Charge | | |
| Deionized Water | 265.00 | |
| Disponil FES-77 | 2.88 | |
| Potassium Persulfate | 1.10 | |
| B) Soap Solution | | |
| Deionized Water | 88.92 | 22.88 |
| T.S.P.P. | 0.40 | 0.10 |
| Disponil FES-77* | 12.89 | 3.31 |
| Aerosol TO-75 | 2.79 | 0.71 |
| C) Monomers & n-DDM | | |
| 2-Ethyl Hexyl Acrylate | 69.15 | 17.73 |
| Butyl Acrylate | 280.00 | 72.20 |
| Methyl Methacrylate | 28.80 | 7.30 |
| Styrene | 18.80 | 5.00 |
| Methacrylic Acid | 7.50 | 2.00 |
| Acrylic Acid | 15.50 | 4.00 |
| RC-705 | 0.25 | 0.05 |
| n-DDM | 0.00 | 0.06 |
| D) Catalyst Charge | | |
| Deionized Water | 54.90 | |
| Potassium Persulfate | 1.10 | |

Adhesive Performance and Test Methods

Adhesive performance data for the acrylic emulsion copolymers prepared in Examples 1 to 4 are presented in Tables 4 to 9. Comparative date from one or more commercial products is also presented.

Shear strength is a measure of the cohesiveness or internal strength of the adhesive. Shear was determined using a Pressure-Sensitive Tape Council (PSTC) test method, with a static load of 500 g and sample-on-panel overlap dimensions of ½"×1/2". Tests were performed on panels inclined 2° from vertical.

90° peel is a measure of the force required to remove an adhesive-coated flexible facestock from a substrate after a specified dwell period, at a 90° angle. Similarly, 1800 peel is a measure of the force required to remove an adhesive coated flexible facestock from a substrate after a specified dwell period, at a 180° angle. Both tests were performed using a PSTC test method. The dwell time was 20 minutes or 24 hours, as indicated, and the pull rate was 300 mm/min.

Loop tack is a measure of the force required to remove a loop of adhesive-coated facestock from a test substrate after a very short dwell and no external pressure. Loop tack was determined in accordance with a PSTC test method. The Water Drop Test is a measure of the adhesive's water resistance, namely, its ability to remain clear in the presence of water. A drop of water is placed on the adhesive at room temperature, and the effect after 20 minutes is observed. "No contour" means that the color of the film does not change, indicating that one cannot observe where the liquid has been placed on the adhesive film. In other words, no contour indicates that the film is water resistant.

The Overlay Application Drop Test is a measure of the adhesive's resistance to soap solutions. A surface, such as glass, is coated with an overlay application fluid, namely an 80:20 water/isopropanol mixture containing less than 1% soap. A drop of overlay application fluid is placed on the adhesive at room temperature. The color of the adhesive is observed after a designated period of time to determine the extent of whitening. Where the results are indicated on a scale of 1 to 5, 1 indicates no effect (the adhesive remained clear) and 5 indicates substantial whitening of the adhesive.

The Boiling Water Test is another measure of the adhesive's water resistance, developed to simulate the effect of pasteurization on the adhesive. This test also serves as a standard method to determine the opacity of candidate adhesive polymers. Typically, a pressure-sensitive adhesive is coated to a level of 20–22 g/m² on a clear, 2 mil biaxially oriented polypropylene (BOPP) (such as Label-Lyte™ 434, Mobil Corp.) facestock or backing, dried at 93° C. in an oven for 10 minutes, and cooled to room temperature. After cooling, the construction is cut, and a sample is immersed in a beaker of boiling (95° C.) water for 10 minutes. The pressure-sensitive adhesive coated construction is then immediately laminated to a clear, 2 mil polyester (Mylarf) film with a plastic squeegee. The opacity development of the adhesive is observed to determine the extent of whitening, with a clear adhesive being preferred.

Particle size measurements were conducted using a Zetamaster S particle sizer using intensity-weighted averaging.

Another water resistance test was conducted to determine the adhesion build-up after wet application. Water containing 1% Teepol is sprayed onto a glass panel. A standard one inch test strip is applied to the glass panel on the water layer and left there for 10 minutes. The water under the test strip is squeezed out, and the adhesion is measured after 6 hours. Tests conducted on the adhesive of Example 2 showed that adhesion builds up quickly to 3 to 7 N/25 mm. In contrast, comparative tests conducted on a commercially available emulsion acrylic pressure-sensitive adhesive used for marking films, from Avery Dennison Corporation, demonstrated an adhesion of only 0.1 to 0.6 N/25 mm after the same amount of time.

TABLE 4

Adhesive Properties of Example 1
The adhesive of Example 1 was coated on a
presiliconized release liner, dried and
applied to a 440 clear PVC facestock.
The dry coat weight was 18 ± 1 g/m².

| | |
|---|---|
| 180° Peel (SS/20 min. dwell) | 700–753 N/M - Clean peel |
| 180° Peel (Glass/20 min. dwell) | 700–770 N/M - Clean peel |
| 180° Peel (TNO/20 min. dwell) | 788–875 N/M - Clean peel |
| 180° Peel (SS/24 hr. dwell) | 945–980 N/M - Clean peel |
| 180° Peel (Glass/24 hr. dwell) | 753–823 N/M - Clean peel |
| 180° Peel (TNO/24 hr. dwell) | 988–1050 N/M - Clean peel |
| Loop Tack (Glass) | 648–770 N/M |
| Shear (SS) | 18,000 min. (1/16" creep)* |
| 180° Peel (TNO/24 hr. water immersion) | 946–1050 N/M - Clean peel |

*After 18,000 minutes, only a slight (1/16") movement of the test sample was observed.

TABLE 5

Water Resistance and Particle Size

Table 5 provides water drop test, overlay
application drop test, boiling water test,
and particle size data for Formulations 4 and
4A to 4H. The formulations were coated directly
on Mylar ™, dried for 10 minutes at 70° C.,
and laminated to BG 50 release liner (a glassine paper).

| Formulation | Water Drop Test | Overlay Application Drop Test* | Boiling Water Test | Particle Size (nm) |
|---|---|---|---|---|
| 4 | no contour | good | clear | 147 |
| 4A | very light contour | bad | very light blue | 270 |
| 4B | no contour | bad | very light blue | 210 |
| 4C | very light contour | bad | very light blue | 271 |
| 4D | no contour | bad | very very light blue | 184 |
| 4E | very light contour | bad | very light blue | 245 |
| 4F | no contour | good | clear | 155 |
| 4G | no contour | good | clear | 141 |
| 4H | no contour | good | clear | 139 |

*Results observed after 20 minutes

The results in Table 5 demonstrate that, of those adhesives tested, those having a mean particle size in the range of approximately 135 nm to 170 nm exhibited the best water resistance.

TABLE 6

Formulations Coated on Presiliconized Polypropylene
Table 6 provides data for Example 2, three crosslinked
versions of Example 2 (Formulations 2A, 2B and 2C), and
a commercially available formulation for comparison.
Formulations 2, 2A, 2B and 2C were coated on presiliconized
polypropylene, dried for 10 minutes at 70° C., and
laminated to clear 640 PVC. Formulations 2A, 2B and 2C were
the same as Example 2, but further contained a crosslinker
(Bacote 20), in amounts of 2%, 4% and 6%, respectively.
The control is an emulsion acrylic pressure-sensitive
adhesive used for marking films, available from Avery
Dennison Corporation. The adhesive coat weight
(dry weight) for each of the tested formulations
was approximately 26 g/m²,
and the adhesives had a pH of about 7.3.

| | 180° Peel (glass) (N/25 mm) | | Overlay Application Drop Test* | Water Drop Test |
|---|---|---|---|---|
| Formulation | 20 min. | 24 hrs. | | |
| 2 (no crosslinker) | 14.0 | 18.2 | 1 | 1 |
| 2A (2% crosslinker) | 14.0 | 19.0 | 1 | 1 |
| 2B (4% crosslinker) | 13.3 | 18.0 | 1 | 1 |
| 2C (6% crosslinker) | 12.3 | 17.8 | 1 | 1 |
| Control | 14.8 | 18.9 | 4 | 3 |

*Results observed after 20 minutes

As discussed above, compositions comprising a crosslinker tend to exhibit better solvent resistance. The above data demonstrates that the presence of a crosslinker does not adversely affect 180° Peel adhesion or water resistance.

TABLE 7

Adhesive Performance of Example 3 Coated on Mylar ™
The adhesives of Example 3 were transfer coated
on Mylar ™, protected with a presiliconized
polypropylene release liner, dried for 10 minutes
at 70° C., and then tested for adhesive performance.
The data in Table 7 represents an average of five
test samples. The adhesives had a dry coat
weight of approximately 24 g/m$^2$.

| | |
|---|---|
| Shear | 238 hours |
| Loop Tack (Stainless Steel) | 4.0 N/25 mm |
| 90° Peel (Stainless Steel/20 min. dwell) | 5.2 N/25 mm |
| 180° Peel (Stainless Steel/20 min. dwell) | 7.7 N/25 mm |
| Loop Tack (Glass) | 12.2 N/25 mm |

TABLE 8

Adhesives of Examples 2, 3 and 4 Coated on
High Quality Vinyl Presiliconized Polypropylene
Table 8 provides data for the adhesives of
Examples 2, 3 and 4. Each adhesive was coated
on a presiliconized polypropylene release liner,
dried for 10 minutes at 70° C., and laminated
to white 8800 PVC. The data for Example 3
represents an average of five test samples.
The data for Example 2 represents an average of
four test samples. For some the tests, the date
for Example 4 represents an average of two
test samples. Adhesive coat weights (dry
weight) were between about 25 and 26 g/m$^2$.

| TEST | Example 2 | Example 3 | Example 4 |
|---|---|---|---|
| Loop Tack (Glass) (N/25 mm) | 14.5 | 13.3 | 16.2 |
| Shear (hrs.) | 100.5 | Not Tested | 101.4 |
| 180° Peel (SS/20 min. dwell) (N/25 mm) | Not Tested | 10.4 | 11.0 |
| 180° Peel (SS/24 hr. dwell) (N/25 mm) | Not Tested | 18.1 | 18.0 |
| 180° Peel (Glass/20 min.) (N/25 mm) | 11.5 | 10.4 | 11.5 |
| 180° Peel (Glass/24 hours) (N/25 mm) | 18.3 | 17.4 | 17.0 |
| Overlay Application Drop Test (1 min.) | 1.75 | Not Tested | 1.5 |
| Overlay Application Drop Test (10 min.) | 2.75 | Not Tested | 1 |
| Overlay Application Drop Test (20 min.) | Not Tested | 1 | Not Tested |
| Water Drop Test (20 min.) | 1.25 | 1 | 1 |

The invention has been described in preferred and exemplary embodiments and aspects, but is not limited thereto. Persons skilled in the art will appreciate that other modifications and applications fall within the scope of the invention.

All references cited herein are incorporated by reference. As used in the text and the claims, the term "about," when used in connection with a range of values, modifies both the low and high values stated.

What is claimed is:

1. A pressure-sensitive adhesive composition prepared by sequential polymerization of at least two monomer mixtures, wherein at least one monomer mixture consists essentially of:
   (1) at least one alkyl acrylate, the alkyl group of which has from about 4 to 12 carbon atoms,
   (2) at least one unsaturated carboxylic acid containing from about 3 to 5 carbon atoms,
   (3) at least one styrenic monomer, and
   (4) at least one other hard monomer selected from the group consisting of vinyl monomers and alkyl methacrylate monomers;
   wherein the composition further includes a surfactant system comprising at least one sodium lauryl ether surfactant at least one sodium dioctyl sulfosuccinate surfactant and sodium pyrophosphate.

2. An adhesive composition as recited in claim 1, wherein the at least one alkyl acrylate is present in a total amount of from about 73% to 90% by weight, based on the total weight of the monomers in the at least one monomer mixture.

3. An adhesive composition as recited in claim 1, wherein the at least one alkyl acrylate is present in a total amount of from about 80% to 85% by weight, based on the total weight of the monomers in the at least one monomer mixture.

4. An adhesive composition as recited in claim 1, wherein the at least one alkyl acrylate is a mixture of at least two alkyl acrylates selected from the group consisting of 2-ethylhexyl acrylate, isooctyl acrylate, and butyl acrylate.

5. An adhesive composition as recited in claim 1, wherein the at least one unsaturated carboxylic acid is present in a total amount of from about 2% to 12% by weight, based on the total weight of the monomers in the at least one monomer mixture.

6. An adhesive composition as recited in claim 1, wherein the at least one unsaturated carboxylic acid is present in a total amount of from about 4% to 7% by weight, based on the total weight of the monomers in the at least one monomer mixture.

7. An adhesive composition as recited in claim 1, wherein the at least one unsaturated carboxylic acid is a mixture of methacrylic acid and acrylic acid.

8. An adhesive composition as recited in claim 1, wherein the at least one styrenic monomer is present in a total amount of from about 3% to 8% by weight, based on the total weight of the monomers in the at least one monomer mixture.

9. An adhesive composition as recited in claim 1, wherein the at least one hard monomer comprises at least one alkyl methacrylate, the alkyl group of which has from 1 to about 4 carbons atoms.

10. An adhesive composition as recited in claim 9, wherein the at least one alkyl methacrylate is present in a total amount of from about 3% to 12% by weight, based on the total weight of the monomers in the at least one monomer mixture.

11. An adhesive composition as recited in claim 1, wherein the at least two monomer mixtures each consists essentially of:
    (1) at least one alkyl acrylate, the alkyl group of which has from about 4 to 12 carbon atoms,
    (2) at least one unsaturated carboxylic acid containing from about 3 to 5 carbon atoms,
    (3) at least one styrenic monomer, and
    (4) at least one other hard monomer selected from the group consisting of vinyl monomers and alkyl methacrylate monomers.

12. A pressure-sensitive adhesive composition prepared by sequential polymerization of at least two monomer mixtures, wherein at least one monomer mixture comprises 2-ethylhexyl accrylate, butyl acrylate, methyl methacrylate, styrene, methacrylic acid and acrylic acid.

13. An adhesive composition as recited in claim 12, wherein the at least one monomer mixture further comprises at least one chain transfer agent.

14. An adhesive composition as recited in claim 12, wherein the composition further comprises a surfactant system comprising at least one surfactant.

15. An adhesive composition as recited in claim 14, wherein the at least one surfactant is selected from the group consisting of sodium lauryl ether surfactants, sodium dioctyl sulfosuccinate surfactants, cetyl trimethyl ammonium bromide, ethoxylated rosin acid emulsifiers, sulfated nonylphenol ethoxylates, sodium alkyl allyl sulfosuccinate surfactants, nonylphenol ethoxylates, sodium nonylphenol ethoxylated sulfates, and disodium ethoxylated alkyl alcohol half esters of sulfosuccinic acids.

16. An adhesive composition as recited in claim 14, wherein the at least one surfactant is selected from the group consisting of sodium lauryl ether surfactants, sodium dioctyl sulfosuccinate surfactants, and sodium pyrophosphate.

17. An adhesive composition as recited in claim 14, wherein the surfactant system comprises at least one sodium lauryl ether surfactant, at least one sodium dioctyl sulfosuccinate surfactant, and sodium pyrophosphate.

18. An adhesive composition as recited in claim 12, wherein the composition is crosslinked with at least one crosslinking agent.

19. An adhesive composition as recited in claim 18, wherein the at least one crosslinking agent is copolymerized with the at least one monomer mixture.

20. An adhesive composition as recited in claim 18, wherein the at least one crosslinking agent is selected from the group consisting of diallyl maleate, diallyl phthalate, polyethylene glycol diacrylate, hexanediol diacrylate, ethoxylated trimethylolpropane triacrylate, pentaerythritol triacrylate, propylene glycol diacrylate, tripropylene glycol triacrylate, and trimethylolpropane trimethacrylate.

21. An adhesive composition as recited in claim 18, wherein the at least one crosslinking agent is added after polymerization of the at least one monomer mixture.

22. An adhesive composition as recited in claim 21, wherein the crosslinking agent is selected from the group consisting of zirconium ammonium carbonate, zinc ammonium carbonate, aluminum acetate, zinc acetate, zirconium acetate, and chromium acetate.

* * * * *

UNITED STATES PATENT AND TRADEMARK OFFICE
CERTIFICATE OF CORRECTION

PATENT NO. : 6,569,949 B1
DATED : May 27, 2003
INVENTOR(S) : Lee et al.

It is certified that error appears in the above-identified patent and that said Letters Patent is hereby corrected as shown below:

Title page,
Item [56], References Cited, U.S. PATENT DOCUMENTS, after "Druschke" insert -- et al. --.

Column 18,
Line 6, after "surfactant" insert -- , --.

Column 20,
Line 14, replace "claim 21," with -- claim 18 --.

Signed and Sealed this

Fifth Day of April, 2005

JON W. DUDAS
*Director of the United States Patent and Trademark Office*